J. H. Webster,
Piston Packing.
N° 66,758.  Patented June 16, 1867.
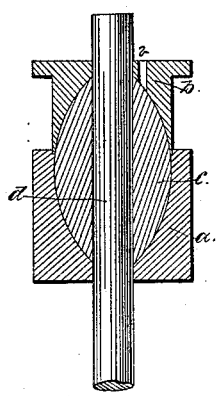
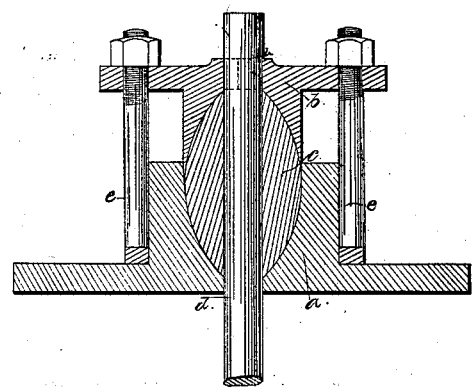
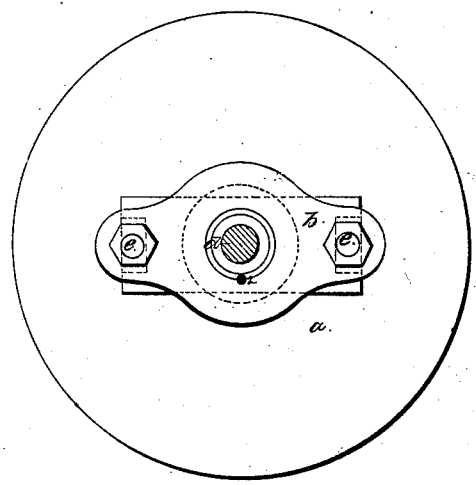
Witnesses:
Inventor:

United States Patent Office.

JOSEPH H. WEBSTER, OF ST. LOUIS, MISSOURI, ASSIGNOR TO HIMSELF AND JOHN KUPFERLE, OF THE SAME PLACE.

Letters Patent No. 66,758, dated July 16, 1867.

IMPROVEMENT IN METALLIC PACKING FOR PISTON-RODS.

The Schedule referred to in these Letters Patent and making part of the same.

TO ALL WHOM IT MAY CONCERN:

Be it known that I, JOSEPH H. WEBSTER, of the city and county of St. Louis, and State of Missouri, have invented certain new and useful Improvements in the Packing of Stuffing-Boxes for steam and other similar engines; and I do hereby declare the following to be a full, clear, and exact description of the same, reference being had to the annexed drawing, making part of this specification, in which—

Figures 1 and 2 are top views of two different styles of stuffing-boxes with the packing glands and bolts applied thereto; and Figures 3 and 4 are longitudinal sections through said stuffing-boxes and glands respectively.

The following description of my invention will enable any one skilled in the arts to which it appertains to make and use the same.

In the drawing, $a$ represents the stuffing-box, which is bored out somewhat in the form of a hyperbola, or it may be in the form of a spindle, or cone, or ellipse, or other analogous form, and the packing gland is bored out in form to correspond with the stuffing-box so as to leave a space for the packing around the piston-rod or valve-stem, substantially of the form shown by $c$, and through the top of the gland by $v$ a hole is made in the manner shown. Now, after the stuffing-box and gland have been thus made and put together, the space $c$ is run full of some soft alloy, so as to form a solid packing of the form substantially as shown by the space. After the packing has been thus formed the piston-rod or valve-stem is taken or driven out, the gland taken off, and the packing taken out, cleaned, oiled, and put back in its place on the piston-rod, after which the gland is put in its place and screwed down on the packing so as to close it tight enough on the rod or stem to make a steam-tight joint, which joint can be maintained steam-tight for a great while, for by screwing down on the gland both ends of the packing are crowded up to the rod or stem, as the result of the shape of the packing. Figs 2 and 3 represent a style of gland and stuffing-box which may be applied to engines having the ordinary style of stuffing-box; the bushing $a$ being made to fit in the stuffing-box of the cylinder-head or steam-chest cover as the case may be.

Having now described the nature and extent of my invention, I claim, and desire to secure by Letters Patent—

In combination with the stuffing-box, the solid alloy packing $c$, when made of an oblong form, and arranged in relation to the stuffing-box, rod, and gland, so that the screwing down of the latter will contract the two ends of the packing around the rod, as shown and described.

JOSEPH H. WEBSTER.

Witnesses:
   CHAS. U. BOYLE,
   S. M. RANDOLPH.